United States Patent
Thomas et al.

(10) Patent No.: US 11,485,671 B2
(45) Date of Patent: *Nov. 1, 2022

(54) METHOD FOR HOMOGENIZING GLASS (71) Applicant: Heraeus Quarzglas GmbH & Co. KG, Hanau (DE)

(72) Inventors: Stephan Thomas, Grosskrotzenburg (DE); Jan Vydra, Hanau (DE); Martin Trommer, Bitterfeld (DE); Michael Huenermann, Alzenau (DE); Andreas Langner, Freigericht (DE); Walter Lehmann, Leipzig (DE); Stefan Hengster, Schaafheim (DE); Klaus Becker, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 208 days.

This patent is subject to a terminal disclaimer.

(21) Appl. No.: 16/662,667

(22) Filed: Oct. 24, 2019

(65) Prior Publication Data
US 2020/0131071 A1    Apr. 30, 2020

(30) Foreign Application Priority Data
Oct. 26, 2018 (EP) ..................... 18202857

(51) Int. Cl.
*C03B 9/36* (2006.01)
*C03B 9/38* (2006.01)
(Continued)

(52) U.S. Cl.
CPC .............. *C03B 32/00* (2013.01); *C03B 23/04* (2013.01); *C03B 23/045* (2013.01)

(58) Field of Classification Search
CPC ..... C03B 23/04; C03B 23/043; C03B 23/047; C03B 23/0473; C03B 23/0496
See application file for complete search history.

(56) References Cited

U.S. PATENT DOCUMENTS 2,904,713 A    9/1959  Heraeus et al.
3,485,613 A *  12/1969 Rice ...................... C03B 23/057
                                                      65/60.5
(Continued)

FOREIGN PATENT DOCUMENTS

DE    102005044947    3/2007
EP         0673888    9/1995
(Continued)

OTHER PUBLICATIONS

EPO0909742 Google Machine Translation Performed Aug. 4, 2021. (Year: 2021).*
(Continued)

*Primary Examiner* — Alison L Hindenlang
*Assistant Examiner* — Steven S Lee
(74) *Attorney, Agent, or Firm* — Dicke, Billig & Czaja, PLLC (57) ABSTRACT

A method for homogenizing glass includes the method: providing a cylindrical blank composed of the glass having a cylindrical outer surface that extends along a longitudinal axis of the blank between a first end face and a second end face, forming a shear zone in the blank by softening a longitudinal section of the blank and subjecting it to a thermal-mechanical intermixing treatment, and displacing the shear zone along the longitudinal axis of the blank. To enable a radial mixing within the shear zone in addition to the tangential mixing with the lowest possible time and energy input, starting from this method, cylindrical sections of the blank are adjacent to the shear zone on both sides, the first cylindrical section having a first central axis and the second cylindrical section having a second central axis, the first central axis and the second central axis being temporarily non-coaxial with each other.

13 Claims, 4 Drawing Sheets

(51) Int. Cl.
  *C03B 17/04* (2006.01)
  *C03B 32/00* (2006.01)
  *C03B 23/04* (2006.01)
  *C03B 23/045* (2006.01)

(56) References Cited

U.S. PATENT DOCUMENTS

| | | | | |
|---|---|---|---|---|
| 3,607,205 | A * | 9/1971 | Latham | C03B 23/047 65/271 |
| 5,443,607 | A * | 8/1995 | Englisch | C03B 32/00 65/102 |
| 5,790,315 | A * | 8/1998 | Fujinoki | C03B 23/0473 359/652 |
| 6,094,941 | A | 8/2000 | Fujinoki | |
| 7,637,125 | B2 | 12/2009 | Nakanishi et al. | |
| 9,278,881 | B2 | 3/2016 | Maida et al. | |
| 10,538,455 | B2 * | 1/2020 | Edmundson | C03B 37/01861 |
| 2003/0066313 | A1 * | 4/2003 | Kerenyi | H01J 9/247 65/110 |
| 2003/0126889 | A1 * | 7/2003 | Otsuka | C03B 19/1415 65/416 |
| 2003/0228119 | A1 | 12/2003 | Oshima | |
| 2005/0144983 | A1 | 7/2005 | Nakanishi | |
| 2006/0117798 | A1 * | 6/2006 | Hirano | C03B 23/055 65/385 |
| 2014/0206524 | A1 | 7/2014 | Maida | |
| 2017/0369359 | A1 * | 12/2017 | Baierl | C03B 32/00 |

FOREIGN PATENT DOCUMENTS

| | | | | |
|---|---|---|---|---|
| EP | 0909742 | A1 * | 4/1999 | C03B 35/163 |
| EP | 1533283 | | 5/2005 | |
| EP | 2757078 | | 7/2014 | |
| WO | WO-2008138744 | A1 * | 11/2008 | C03B 23/047 |
| WO | WO-2016118144 | A1 * | 7/2016 | C03B 23/045 |

OTHER PUBLICATIONS

Non-Final Office Action dated Mar. 15, 2022 in U.S. Appl. No. 16/662,610.
Heraeus "OM 100", Jul. 2019, www.heraeus-conamic.com.

* cited by examiner

METHOD FOR HOMOGENIZING GLASS

CROSS-REFERENCED TO RELATED APPLICATION

This Utility Patent Application claims priority to European Application No. 18 202 857.1 filed on Oct. 26, 2018, which is incorporated herein by reference. This Utility Patent Application is related to co-pending U.S. Ser. No. 16/662,610, entitled "METHOD AND DEVICE FOR HOMOGENIZING GLASS", filed Oct. 24, 2019.

TECHNICAL FIELD

One aspect relates to a method for homogenizing glass by providing a cylindrical blank composed of the glass having a cylindrical outer surface that extends along a longitudinal axis of the blank over a length of the blank between a first end face and a second end face, forming a shear zone in the blank by softening a longitudinal section of the blank and subjecting it to a thermal-mechanical intermixing treatment, and displacing the shear zone along the longitudinal axis of the blank.

BACKGROUND

A zone melting method of this type is known from U.S. Pat. No. 3,485,613 A. The solid glass cylinder or the glass cylinder filled with a powder mixture, which is clamped in a glass lathe, is locally heated and is twisted zonally. As the heat source, single- or multi-flame burners or electric heat sources are employed. The dimension of the shear zone in the direction of the axis of rotation (=width of the shear zone) depends on the viscosity. For viscosities of less than about $10^{13}$ Poise (dPa·s), it is adjusted to a value in the range of between 0.1 and 3 times the rod diameter, and for viscosities of less than about $10^5$ Poise (dPa·s) to a value in the range of between 0.1 and 1 times the rod diameter. It can be narrowed by laterally acting cooling means.

The blank to be homogenized is arranged horizontally and the supports for the ends of the blank are horizontally opposite each other. The shear zone produced on the basis of this concept is theoretically even, circular and rotationally symmetrical. The material transport in the shear zone runs substantially tangentially, but not in the radial direction. This means that radial glass defects in the blank are very difficult or impossible to eliminate. In particular, any bubbles that are present are not transported to the cylindrical outer surface, but they remain in the bulk of the material. Equally, radial concentration gradients of a dopant are not eliminated. The problem is intensified by the fact that heat transport from the outside to the inside is slow as a result of the thermally insulating effect of quartz glass. It is therefore colder in the centre of the shear zone than at the surface, which contributes to a higher viscosity and lower intermixing and makes it difficult for any crystallites to melt completely. Also, it is impossible to achieve homogenization in the direction of the axis of rotation by a simple zone melting method.

To homogenize a quartz glass composition in three directions running perpendicular to each other, a multi-step zone melting method is proposed in EP 673 888 B1, in [which] a ball-like quartz glass body is produced as an intermediate product by compressing a twisted rod, at both ends of which support rods are placed, which run transversely to a previous axis of rotation and by means of which the ball-like quartz glass body is elongated and subjected to a further zone melting method with a different axis of rotation. During twisting, one support rod rotates at e.g. 70 to 100 revolutions per minute and the other support rod rotates in the opposite direction at 1 to 3 times this speed. Oxyhydrogen or propane gas burners or electric heating elements are employed as the heat source.

U.S. Pat. No. 2,904,713 A describes a homogenizing process for quartz glass, in which the softened quartz glass composition supported on two support rods is alternately compressed and stretched by moving the support tubes away from or towards each other.

The known multi-step zone melting method is time-consuming and energy-intensive.

One aspect is therefore based on the problem of modifying the zone melting method for homogenizing glass, in particular for glass with a high Sift content and particularly for quartz glass, such that with the lowest possible time and energy input, in addition to the tangential mixing a radial mixing within the shear zone is made possible.

SUMMARY

One embodiment relates to a method for homogenizing glass, comprising the following steps:
(a) providing a cylindrical blank composed of the glass having a cylindrical outer surface that extends along a longitudinal axis of the blank over a length of the blank between a first end face and a second end face,
(b) forming a shear zone in the blank by softening a longitudinal section of the blank and subjecting it to a thermal-mechanical intermixing treatment, and
(c) displacing the shear zone along the longitudinal axis of the blank Optical components composed of glass installed in high-precision systems are subject to strict requirements in terms of their transparency and homogeneity. Often, however, glass exhibits heterogeneous structures, such as layers and so-called "striae", which are attributable to regions of glass with different compositions or differences in the refractive index.

This is particularly problematic for high-silica glass with a high content of $SiO_2$ of e.g. more than 80 wt. %, and in particular for quartz glass with an $SiO_2$ content of 87 wt. % or more. In this case, even at temperatures close to sublimation the viscosity can still be so high that homogenization in a crucible by stirring or refining is impossible.

To eliminate striae and layers in quartz glass, crucible-free melting methods are known in which a cylindrical starting body is clamped in headstocks of a glass lathe and softened zonally, the headstocks simultaneously rotating at different speeds or in opposite directions around an axis of rotation. As a result of the different rotation of the starting body on either side of the softening zone, torsion (twisting) occurs there and thus mechanical intermixing in the bulk of the glass. The region of the intermixing is also referred to here as the "shear zone". The shear zone is displaced along the starting body and this is shaped and intermixed along its length in the process. Heterogeneous structures (striae and layers) are thus reduced or eliminated. The result of this thermal-mechanical intermixing treatment is a blank composed of at least partially homogenized glass. This type of thermal-mechanical intermixing treatment by tool-free shaping is also referred to below as a "homogenizing process", "zone melting method" or "twisting", and the at least partially homogenized cylindrical blank that is present after the twisting is referred to as a "twisted rod".

BRIEF DESCRIPTION OF DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

Embodiments are described in more detail below with reference to an exemplary embodiment and a drawing. The individual figures illustrate schematic illustrations of the following.

DETAILED DESCRIPTION

In the following Detailed Description, reference is made to the accompanying drawings, which form a part hereof, and in which is illustrated by way of illustration specific embodiments in which one embodiments may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiments. The following detailed description, therefore, is not to be taken in a limiting sense, and the scope of the present embodiments are defined by the appended claims.

It is to be understood that the features of the various exemplary embodiments described herein may be combined with each other, unless specifically noted otherwise.

According to one embodiment, starting from a method of the type mentioned above, problems are solved on the one hand by the fact that cylindrical sections of the blank are adjacent to both ends of the shear zone, of which the first cylindrical section has a first central axis and the second cylindrical section has a second central axis, the first central axis and the second central axis being at least temporarily non-coaxial with each other.

The method according to one embodiment is used for the production of glass, in particular of high-silica glass and most particularly of pure or doped quartz glass, which is at least partially homogenized. The cylindrical blank here is subjected to a thermal-mechanical intermixing treatment, the zone melting method. To this end, the blank—generally extended at both ends by means of fused-on support rods—is clamped into a rotating means, such as a glass lathe, which is equipped with at least one heat source for the local softening of the blank. As a result of different rotational speeds and/or directions of rotation of the blank supports at either end, a shear zone forms in the softened glass, in which torsion and thermal-mechanical intermixing of the glass take place. By continuously displacing the heating means along the blank and/or by continuously displacing the blank along the heating means, the shear zone is pushed through the blank. This thermal-mechanical intermixing treatment includes one or more passes (multiple twisting strokes), in which the shear zone is displaced along the longitudinal axis of the blank in one direction and/or in a reversing manner.

The spatial orientation of the longitudinal axis of the blank during homogenizing is arbitrary. The blank is often clamped in the rotating means with a horizontally oriented longitudinal axis, in which case dummy rods can be welded to the ends of the blank to minimise the loss of good material. The blank holders at both ends, such as e.g. the spindles of a glass lathe, have the same axis of rotation in the prior art and this is coaxial with the longitudinal axis of the blank to be homogenized. A circular shear zone forms, wherein the central axes of the cylindrical sections of the blank bordering both ends of the shear zone are coaxial with each other and in the common axis of rotation.

In contrast thereto, it is provided that the first central axis and the second central axis are at least temporarily non-coaxial with each other. The shear zone that forms as a result is not rotationally symmetrical, i.e. also not circular. It has been shown that the material transport within this shear zone takes place not only purely tangentially but also in the radial direction.

This non-coaxial orientation of the central axes of the two cylindrical sections is established most simply in a blank with a shear zone that is already softened; it can be maintained permanently during the thermal-mechanical intermixing treatment or it can be varied in time or extent during said treatment. The effect of a "three-dimensional homogenizing" according to the prior art in terms of freedom from striae, freedom from bubbles and refractive index distribution is, to a certain extent, achievable in this way even with only a single intermixing operation (twisting stroke).

The zone melting method with non-coaxial central axes can be implemented in various ways. For example, the central axes of the two cylindrical sections can be offset parallel to each other, they can be tilted relative to each other, thus forming an angle, or they can run skew to each other.

In a first basic concept, the first central axis and the second central axis are at least temporarily offset relative to each other. In the simplest case the first central axis and the second central axis run parallel (in their extension) but with a lateral offset relative to each other.

The offset of the central axes here is in one embodiment adjusted to a value in the range of between 0.5% and 15% of the diameter of the blank. For blanks with outer diameters of less than 50 mm, a central axis offset in the upper offset range (2 to 15%) is most suitable, and for blanks with outer diameters of 50 mm and more a central axis offset in the lower offset range (0.5 to 7%) is most suitable.

In a preferred embodiment of this basic concept, the first central axis and second central axis are offset relative to each other, at least the first central axis additionally being offset relative to a first machine axis of rotation around which it is rotated.

The first machine axis of rotation corresponds e.g. to the axis of rotation of the rotating means for the first cylindrical section. The first central axis of the cylindrical section generally runs parallel to this axis of rotation but with a lateral offset, i.e. outside the axis of rotation of the rotating means. The relevant cylindrical section here does not necessarily rotate around its own (first) central axis, but around the first machine axis of rotation, so that during this rotation it describes a circular path around this first machine axis of rotation. Since this axis of rotation does not run through the centre of gravity of the first cylindrical section, a static imbalance forms which permanently deforms the shear zone.

Similarly, the central axis of the second cylindrical section can in turn be offset relative to a second machine axis of rotation, which corresponds e.g. to the axis of rotation of the rotating means for the second cylindrical section. In one embodiment, however, the second cylindrical section rotates around its own (second) central axis, which is coaxial with the second machine axis of rotation and particularly in one embodiment also coaxial with the first machine axis of rotation.

Figure 10:
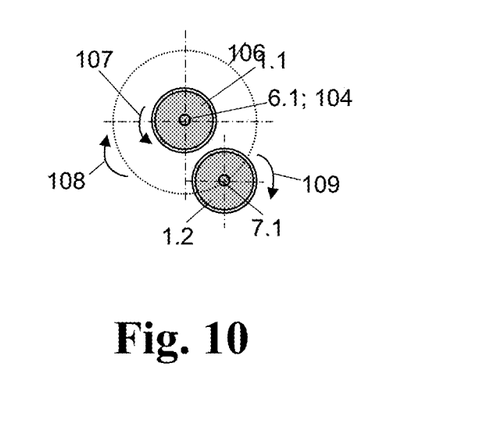
FIG. 10: a sketch to explain an embodiment of the thermal-mechanical intermixing treatment

FIG. 10 explains this concept with the aid of a position and rotation sketch. The first cylindrical section 1.1 here is connected to a first spindle 6 (see FIG. 1) of a lathe and the second cylindrical section 1.2 to a second spindle 7 of the lathe. The spindles 6; 7 at either end define a machine axis of rotation 104. In the exemplary embodiment the second cylindrical section 1.2 is mounted eccentrically on the second spindle 7 in relation to the machine axis of rotation; in other words, the central axis 7.1 of the second cylindrical section 1.2 lies outside the machine axis of rotation 104 of the lathe. The relevant cylindrical section 1.2 therefore describes a circular path 106 around the axis of rotation 104 with the rotational speed and direction of rotation 108 of the second spindle. The first cylindrical section 1.1 can be arranged eccentrically or coaxially relative to the axis of rotation 104. In the exemplary embodiment of FIG. 10, however, the central axis 6.1 and the machine axis of rotation 104 coincide, the first cylindrical section 6.1 rotating around its central axis 6.1 by means of the first spindle in one embodiment with a direction of rotation 107 opposite to 108. The second cylindrical section 1.2 additionally rotates about its central axis 7.1 in the direction of rotation indicated by the rotational direction arrow 109.

Figure 11:
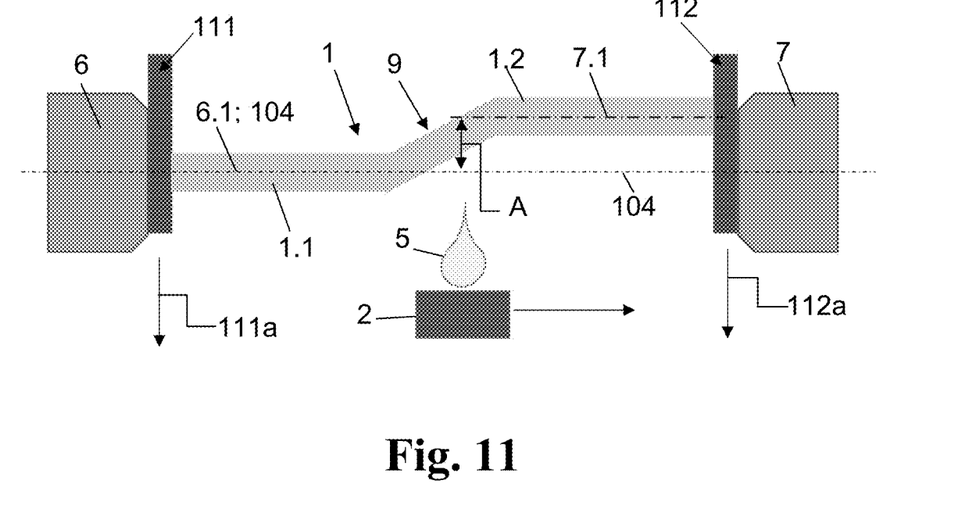
FIG. 11: a schematic illustration of a means suitable for carrying out the thermal-mechanical intermixing treatment.

This is achieved in design terms e.g. by a device as illustrated schematically in FIG. 11. For the eccentric support of the second cylindrical section 1.2 here, a chuck 112 that can be displaced from the middle of the spindle head is employed for the rotatable support of the first cylindrical section 1.2. Similarly, the first cylindrical section 1.2 is also mounted rotatably around the machine axis of rotation 104 on a chuck 111 that can be displaced from the middle of the spindle head. The displaceability of the respective chucks 111, 112 is indicated by the directional arrows 111a and 112a respectively. The block arrow A illustrates the offset of the axis 7.1 from the axes 6.1 and 104.

In the shear zone in this concept there is torsion due not only to different rotations of the cylindrical sections around their respective central axes, but also to the torque of the imbalance that is permanently acting thereon. This results in particularly intensive intermixing in the shear zone.

In another embodiment of the first basic concept, the first cylindrical section is rotated around a first axis of rotation and the second cylindrical section around a second axis of rotation, the first and second axes of rotation running parallel to each other and being offset relative to each other.

In this embodiment, the two cylindrical sections rotate around their respective central axes and they have no common axis of rotation. In the shear zone, torsion occurs not only through the different rotations of the cylindrical sections but also through the lateral offset of the two central axes relative to each other.

In the method variants of the first basic concept described above, the first central axis and the second central axis extend with a lateral offset and parallel to each other. The parallel arrangement of the central axes is simple to achieve from a design point of view. A second basic concept of the embodiment is distinguished by the fact that the first central axis and the second central axis are tilted relative to each other or run skew to each other at least at times during the homogenizing process.

This results in particularly intensive intermixing in the shear zone. In the case of the tilt, the two central axes form a tilt angle which can be varied in the course of the zone melting method. In one embodiment, however, the tilt angle is adjusted to the range of 145 to 175 degrees and is kept constant during the zone melting method. In the case of a skew axis arrangement, a tilt angle is obtained in the projection of the axis arrangement on to one of the planes in which one of the central axes extends.

For homogenizing heavy blanks in particular, a tilt in which the cylindrical sections extend obliquely downwards, starting from the shear zone, has proved advantageous.

This means that the shear zone is at the top and is supported by the two cylindrical sections at the bottom.

In another, equally preferred tilt variant, the cylindrical sections are oriented such that they extend obliquely upwards, starting from the shear zone.

This means that the shear zone is at the bottom, which is particularly easy to achieve because of the cylindrical sections' own weight.

In the embodiments of the first basic concept, the offset between the cylindrical sections at either end and/or the tilt of the respective central axes relative to each other cause(s) an intermixing of the quartz glass in three spatial directions. Bubbles and other inhomogeneities are thus drawn out around the axis of rotation in a screw-like manner. In contrast to the known method, in which bubbles and other inhomogeneities are distributed in closed, coaxial rings around the axis of rotation, which are difficult to collapse further, the screw shape can be drawn out further and thinned by rotation until it dissipates. This is also particularly readily achieved by a second twisting stroke in the opposite direction of rotation to the first twisting stroke.

On the other hand, the above-mentioned technical problem is also solved according to one embodiment, starting from a method of the type mentioned above, by the fact that the displacement of the shear zone along the longitudinal axis of the blank is superimposed at least at times with an oscillating motion of the shear zone along the longitudinal axis of the blank.

Independently of the transverse displacement of the shear zone along the longitudinal axis of the blank, the shear zone performs an alternating motion with a small amplitude. It has been shown that this also leads to a non-rotationally symmetrical shear zone within which material transport occurs not only purely tangentially but also in the radial and even in the axial direction.

The oscillating motion of the shear zone is generated in a blank with an already softened shear zone and it can be maintained permanently during the homogenizing process or it can be varied in its extent over time. By means of this measure too, the effect of "three-dimensional homogenizing" can be achieved to a certain extent in terms of freedom from striae, freedom from bubbles and refractive index distribution, even with just a single intermixing operation (twisting stroke).

In a first preferred technique, the oscillating motion of the shear zone is generated by rotating the first end of the blank at a first rotational speed and the second end of the blank at a second rotational speed, periodically varying the first and/or second rotational speed.

The changes to the first and second rotational speeds here are in one embodiment such that both the level of at least one of the rotational speeds and the difference in speed between the first and second rotational speeds vary periodically.

In another preferred technique the oscillating motion of the shear zone is generated by the fact that the displacement of the shear zone along the longitudinal axis of the blank is caused by linear axial translational movement of a heat source along the longitudinal axis of the blank, wherein a reversing motion of the heat source is superimposed on the translational motion.

The heat source performs a type of pendulum motion, the path of the motion being composed of comparatively long distances of the forward motion of the shear zone at a displacement speed, regularly or irregularly interspersed with comparatively short distances of the backward motion at the same or a different displacement speed.

In all the embodiments of the method described above, a non-rotationally-symmetrical shear zone is produced, which allows intermixing not only in the tangential direction but also in the radial and partially also in the axial direction of the longitudinal axis of the blank. This also results in a more even radial temperature distribution in the shear zone, so that bubbles are transported to the surface and the bubble content in the bulk of the glass is reduced overall. Any crystallites present in the starting material of the blank also melt completely and are eliminated in this way. In the case of doped quartz glass, furthermore, a more homogeneous dopant distribution is achieved and refractive index fluctuations are eliminated.

The more even radial temperature distribution in the shear zone also promotes the formation of a narrow shear zone. A narrow shear zone causes more intensive intermixing of the bulk of the glass than a comparatively wider shear zone. The optimum width of the shear zone depends on the diameter of the blank. As a rule of thumb, with a blank with the diameter D the shear zone has a width that is less than $0.3 \times D$.

In the zone melting method, the rotational speeds $\omega_1$ and $\omega_2$ on either side of the "shear zone" are unequal. The amount of the difference in the rotational speeds at either end is obtained from $\Delta\omega=|\omega_2-\omega_1|$; in the case of rotation in opposite directions, one of the rotational speeds has a negative sign. Within the shear zone a transition occurs from one rotational speed $\omega_1$ to the other at. In the middle of the shear zone a rotational speed is established which corresponds to the mean value $\overline{v;}$ between the rotational speeds at either end, $(\overline{v;}=(\omega_2+\omega_1)/2)$. The "shear zone" here is defined as that part of the bulk of the glass where, for the axial change in the rotational speed $d\omega/dx$, $|d\omega/dx|>0.5\times|d\omega/dx|_{max}$ applies. The "width of the shear zone" is defined as the longitudinal section in the direction of the longitudinal axis of the blank in which the above condition is fulfilled.

The rotational speeds are determined by measuring the surface speed using optical image processing and evaluating the movement of irregularities close to the surface, such as e.g. bubbles.

In a shear zone that is too wide, both the local speed gradient and the local viscosity gradient are so low that bubbles, crystals and other glass defects can be retained as a whole, depending on their thermal stability. For optimal dissipation, it is advantageous for one part of the glass defect to still be held in the colder, more viscous part, while less viscous, hotter melt flows over it on the other side where it is dissipated/distributed. If the viscosity gradient is too low, it is only "turned" and is eventually simply entrained.

In a particularly preferred technique of one embodiment, the homogenizing measures explained above that include a non-coaxial arrangement of the axes of rotation of the cylindrical sections at either end of the shear zone are combined with the homogenizing measures likewise explained above that relate to an oscillating motion of the shear zone.

In this technique for homogenizing glass, the measure in which cylindrical sections of the blank are adjacent to the shear zone on both sides, of which the first cylindrical section has a first central axis and the second cylindrical section has a second central axis, and the first central axis and the second central axis are at least temporarily non-coaxial with each other during homogenizing, is combined with a measure in which the displacement of the shear zone along the longitudinal axis of the blank is superimposed at least at times with an oscillating motion of the shear zone along the longitudinal axis of the blank.

The oscillating motion of the shear zone here is in one embodiment generated on the basis of a method variant in which the first end of the blank is rotated at a first rotational speed and the second end of the blank is rotated at a second rotational speed, and the first and/or second rotational speed is periodically varied, or it is generated on the basis of a method variant in which the displacement of the shear zone along the longitudinal axis of the blank is caused by linear axial translational movement of a heat source along the longitudinal axis of the blank, wherein a reversing motion of the heat source is superimposed on the translational motion Another technique has proved favourable, in which a thermal radiation dissipator at least partially surrounding the shear zone is employed, the lateral dimension of which, in the direction of the longitudinal axis of the blank, is greater than the shear zone and smaller than the length of the blank, wherein the thermal radiation dissipator is moved along the longitudinal axis of the blank synchronously with the shear zone.

The thermal radiation dissipator absorbs at least part of the heat energy from the region of the shear zone by heat radiation, heat conduction or heat convection, is itself heated thereby and emits at least part of this energy back to the blank and in particular to the shear zone as longer-wave infrared radiation. Because its lateral dimension is greater than the shear zone, however, heat energy is also transferred to the glass adjacent to the shear zone. As a result of the heating of the regions of the glass bulk bordering the shear zone, i.e. before and after the shear zone, the radial temperature gradient is reduced since, as a result of this pre-heating, the bulk of the glass that is about to enter the shear zone requires a lower additional heat input from the heat source in order to reach an adequate temperature.

The consequence of this is that the maximum temperature in the peripheral region of the blank, and thus also the temperature difference between the middle and the periphery of the blank, is lower than in a shaping process without a thermal radiation dissipator.

The thermal radiation dissipator thus reduces the temperature gradients and contributes to evening out the temperature profile within the shear zone. As a result, the risk of cracking due to mechanical stresses [is] reduced.

With a view to, as far as possible, a complete capture, conversion and utilisation of the heat radiation emitted from the shear zone, however, a design of the thermal radiation dissipator in which it surrounds the cylindrical surface, in one embodiment in the form of a tube, has proved expedient. The tube may optionally be completely or partially open at both ends and it has a closed or largely closed tube wall. Losses of heat energy by radiation or convection are thus reduced. In the simplest case, the inner bore of the tube is cylindrical with a round, oval or polygonal cross-section. It can extend coaxially to the longitudinal axis of the blank and can be e.g. conical, or can have heterogeneity in the axial direction, such as for instance a change in cross-section. Openings can be present in the tube wall, through which part of the heat can be dissipated or through which an active cooling is possible to allow the heat input to be adjusted with a view to a shear zone that is as narrow as possible. The tube wall is in one piece or is composed of multiple tube sections joined together or of multiple other components. The heat source here is either located within the tube opening or acts on the shear zone from outside, e.g. through one or more openings in the tube wall or through a longitudinal slit. A longitudinal slit in an otherwise continuous tube wall also has the advantage that mechanical stresses due to the high temperatures and thermal expansion are avoided, which compensates for any disadvantages due to the longitudinal slit in terms of the effect on the temperature homogenization in and around the shear zone.

A thermal radiation dissipator is employed, the dimension of which is smaller in the direction of the longitudinal axis of the blank than the length of the blank, this being moved synchronously with the shear zone along the longitudinal axis of the blank. Through the fact that the thermal radiation dissipator moves along the longitudinal axis of the blank together with the shear zone, it is ensured that the temperature conditions in the shear zone and the adjacent regions of the bulk of the glass do not vary during the shaping process.

A thermal radiation dissipator that is short compared to the length of the blank furthermore ensures that the temperature at its inside is high, so that sublimation deposits are vitrified and cannot fall off on to the blank.

Between the thermal radiation dissipator and the blank, a clearance in the range of 15% to 80% of the diameter of the blank is in one embodiment established. The gap affects the temperature at the surface of the blank and the temperature distribution. With a comparatively large gap, the radiation intensity impinging on the surface of the blank is lower, but the irradiated surface region is larger because of the wider radiation angle. With a clearance of more than 80% of the diameter of the blank, a comparatively large irradiated area is obtained, which counteracts a narrow shear zone. With a comparatively small clearance of less than 15% of the diameter of the blank, pressure can build up as a result of enclosed gases, which impedes access for a burner or plasma flame.

It has proved particularly expedient if a thermal radiation dissipator is employed having a wall with a partially reflective inner surface, facing the shear zone, which is formed using a glass layer at least 0.1 mm thick composed of a quartz glass that is transparent to infrared radiation from the NIR wavelength range. This glass layer in one embodiment does not have any open pores in which foreign materials could settle, so that contamination is prevented from entering the blank during the twisting process. The formation of the glass layer from NIR-transparent quartz glass ensures that the reflectance of the inner surface, and thus its influence on the temperature profile in the region of the shear zone, does not vary in the course of time as a result of vaporised $SiO_2$ if this precipitates on the inner surface as an $SiO_2$ layer (also referred to below as an "$SiO_2$ deposit") and vitrifies as a result of the high temperatures during the twisting process. For both effects (purity and reflectance), a layer thickness of e.g. 0.1 mm or more is sufficient.

The glass layer is transparent to infrared radiation from the NIR wavelength range, but part of this is reflected on the inner surface owing to the difference in refractive index between the gas atmosphere and the glass. The reflected portion of the impinging total radiation intensity is generally about 4%. The non-reflected part of the infrared radiation propagates further in the transparent layer and a small part of it is scattered or absorbed. In one embodiment, the radiation component transmitted here impinges on [a] layer of opaque quartz glass, which diffusely scatters and absorbs infrared radiation. The opacity of the layer of opaque quartz glass prevents the direct transmission of the infrared radiation in favour of scattering and absorption. On the layer of opaque quartz glass, part of the infrared radiation is again reflected. The double reflection on the layer sequence of glass layer and layer of opaque quartz glass means that the non-reflected radiation component is only absorbed within the infrared-radiation-absorbing layer of opaque quartz glass and generates heat there, whereas the hot gas atmosphere around the shear zone only affects the inside facing the blank by heat conduction. The heat input into the thermal radiation dissipator by radiation therefore takes place substantially in the layer of opaque quartz glass and thus at a different point than the heat input by heat conduction. As a result, on the one hand the inside remains hot enough to bind $SiO_2$ deposits on the inside and vitrify them so that they do not fall off, and on the other hand overheating of the inside is avoided. The opacity of the layer of opaque quartz glass is in one embodiment caused by a porosity of the quartz glass in the range of 2 to 8%.

The thermal radiation dissipator in one embodiment consists completely of quartz glass and particularly in one embodiment of quartz glass that has been produced synthetically from silicon-containing starting substances by pyrolysis or hydrolysis.

Definitions and Measuring Methods

Individual steps and terms in the above description as well as measuring methods are additionally defined below. The definitions are part of the description of the embodiments. If there is a material contradiction between one of the following definitions and the rest of the description, the statements in the description are definitive.

Quartz Glass

Quartz glass here means glass with an $SiO_2$ content of at least 87 wt. %. It is undoped ($SiO_2$ content=100%) or it contains dopants, such as e.g. fluorine, chlorine or oxides of rare earth metals, aluminium or titanium. A high-silica glass means a glass with an $SiO_2$ content of at least 80 wt. %.

Porosity—Measuring the Pore Volume

The "pore volume" of a porous material refers to the free volume within the material occupied by voids. The pore volume is measured using e.g. a porosimeter, where a non-wetting liquid (such as e.g. mercury) is pressed into the pores of a porous material under the action of an external pressure against the opposing surface tension forces. The force needed is inversely proportional to the pore size and therefore, as well as the total pore volume, the pore size distribution of the sample can also be determined. Mercury porosimetry only detects pore sizes above 2 nm (mesopores and macropores).

"Micropores" are pores with pore sizes of less than 2 nm. Their contribution to the porosity and to the specific surface area is determined using the V-t method by nitrogen absorption, where a sample is held at different pressures and 77 K. The method is equivalent to the BET method, the pressure range being extended to higher pressures so that surface areas of the non-microporous part of the material are also determined.

Transparency in the NIR Wavelength Range

For the wavelength range of the "near infrared" (abbreviated as NIR), there are different nomenclatures. Within the framework of this application, in accordance with DIN 5031 part 7 (January 1984), it is defined as the spectral range between 780 nm and 3000 nm.

Transparent in the NIR wavelength range refers here to a glass which, with a sample thickness of 10 mm, transmits at least 50% of the impinging NIR radiation power.

Measuring the Concentration of Hydroxyl Groups (OH Groups)

The measurement takes place using the method of D. M. Dodd and D. B. Fraser, "Optical determination of OH in fused silica", *Journal of Applied Physics*, Vol. 37(1966), p. 3911.

Providing a Cylindrical Blank Composed of Doped Quartz Glass

EXAMPLE 1

Production by Gas Pressure Sintering

A cylindrical compact of $SiO_2$ pellets was fused in a gas pressure sintering process to form a component composed of the doped, transparent quartz glass. The gas pressure sintering process was performed in a gas pressure sintering furnace with an evacuable sintering mould composed of graphite with a cylindrical inner space. The mould was first heated to the sintering temperature of 1700° C. while maintaining a negative pressure. Once the sintering temperature was reached, a positive pressure of 15 bar was established in the furnace and the mould was held at this temperature for approx. 30 min. During the subsequent cooling to room temperature, the positive pressure was further maintained until a temperature of 400° C. was reached. The quartz glass blank obtained had a diameter of 16 mm and a length of 100 mm.

EXAMPLE 2

Production by Vapour Deposition

By outside deposition on a support body using the known OVD method, a soot body made of quartz glass was produced and this was then vitrified in a vacuum furnace. From the vitrified OVD cylinder a ⅙ longitudinal segment was cut and this was rounded on a glass turning machine. A quartz glass blank was obtained with a diameter of 80 mm which displayed a marked variation in refractive index across the diameter, caused substantially by the inhomogeneous distribution of the OH content.

Zone Melting Method

METHOD EXAMPLE (A)

The blank according to example 1 was then subjected to a zone melting method (twisting). This processing operation is illustrated in a diagram in FIG. 1. For this purpose, two support rods 3 were welded on to the end faces of the rod-shaped blank 1 using a plasma torch. The support rods 3 were clamped in the spindles 6, 7 of a glass lathe. The spindles 6; 7 define a working distance "D" of the glass lathe.

Figure 1:
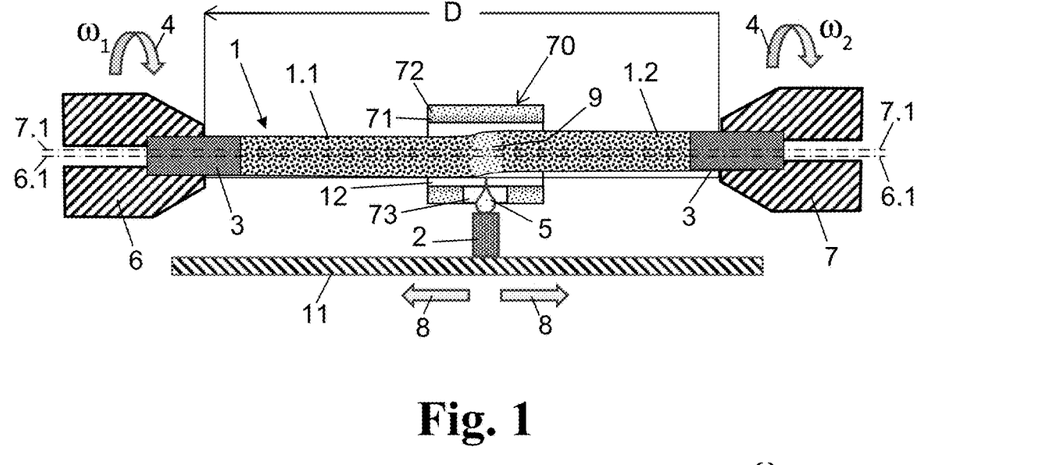
FIG. 1: a device for carrying out the zone melting method with axes of rotation offset relative to each other according to one embodiment.

The glass lathe was equipped with an oxygen-hydrogen heating burner 2, which produced an oxyhydrogen flame 5.

The heating burner 2 was mounted on a displaceable carriage 11 and was moved thereon, by means of a drive, along the blank 1 which was clamped in the glass lathe (indicated in the Figure by the directional arrows 8), the blank 1 being heated locally to over 2000° C. The impingement area of the oxyhydrogen flame on the surface of the blank had a width of about 20 mm.

As a result of unequal rotational speeds ($\omega 1$=80 rpm, $\omega 2$=(−170) rpm) and opposite directions of rotation of the two glass lathe spindles 6, 7 a shear zone 9 formed in the heating region of the oxyhydrogen flame 5. In the shear zone 9, an intermixing and thus homogenizing of the glass took place. Its width B was smaller than the impingement area of the oxyhydrogen flame 5 and was about 5 mm. The shear zone 9 was moved along the longitudinal axis of the blank 10 by a reversing motion of the oxygen-hydrogen burner 2, intensively intermixing the rod-shaped blank 1 along its entire length. In its movement along the longitudinal axis of the blank the shear zone 9 was limited at one side by a right-hand cylindrical section 1.2 and at its other side by a left-hand cylindrical section 1.1.

As soon as the soft shear zone 9 had formed, the two spindles 6, 7 of the glass lathe were offset radially to each other by about 2 mm such that the spindle's two axes of rotation 6.1 and 7.1 were parallel but not coaxial to each other. Because of this radial offset, a deformation of the shear zone 9 was obtained in the direction of a non-circular, non-rotationally-symmetrical shape and a smaller width. This increased the homogenizing efficiency of the zone melting method.

The homogenized glass cylinder thus obtained had a diameter of about 15.5 mm and a length of about 100 mm.

Figure 2:
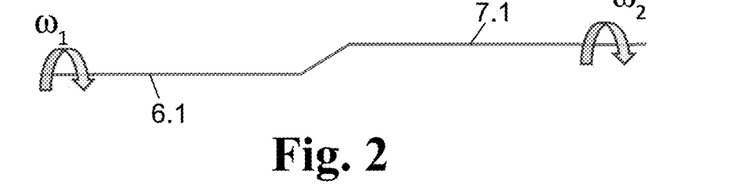
FIG. 2: a rotation figure for a blank which is obtained in a first procedure.

FIG. 2 illustrates a diagram of the corresponding rotation figure in a side view of the central axes 6.1 and 7.1: the first cylindrical section 1.1 and the second cylindrical section 1.2 here are each rotated around their own axes of rotation, which run parallel to each other and which are offset relative to each other by the said 2 mm in their vertical position owing to the spindle offset. The axes of rotation correspond to the central axes 6.1 (for the cylindrical section 1.1) and 7.1 (for the cylindrical section 1.2). The two cylindrical sections 1.1 and 1.2 thus have no common axis of rotation. In the shear zone 9 torsion is obtained not only due to the different rotations of the cylindrical sections 1.1; 1.2 but also due to the lateral offset of the two central axes 6.1 and 7.1 relative to each other.

METHOD EXAMPLE (B)

To homogenize the OH distribution, the blank according to example 2 was likewise subjected to a zone melting method. The processing operation took place using the device illustrated schematically in FIG. 1 with the additional use of a tubular thermal radiation dissipator surrounding the shear zone 9. This had a length (dimension in the direction of the longitudinal axis of the blank) of 300 mm; an inner diameter of 120 mm and a wall thickness of 27 mm. It was likewise mounted on the carriage 11 and was moved synchronously with the heating burner 2 and with the aid of the same drive along the blank 1 clamped in the glass lathe. The wall of the thermal radiation dissipator 70 had an opening 73, through which the heating burner 2 or oxyhydrogen flame 5 projected. Between the blank 1 and the inner wall of the thermal radiation dissipator 70 an annular gap 12 remained, with an average gap width of 20 mm.

As a result of unequal rotational speeds ($\omega 1=(-40)$ rpm; $\omega 2=120$ rpm) and opposite directions of rotation of the two glass lathe spindles 6, 7 a shear zone 9 formed in the heating region of the oxyhydrogen flame 5. In the shear zone 9, an intermixing and thus homogenizing of the glass took place. Its width B was smaller than the impingement area of the oxyhydrogen flame 5 and was about 10 mm. The shear zone 9 was moved along the longitudinal axis of the blank 10 by a reversing motion of the oxygen-hydrogen burner 2, intensively intermixing the rod-shaped blank 1 along its entire length.

In its movement along the longitudinal axis of the blank the shear zone 9 was limited at one side by a right-hand cylindrical section 1.2 and at its other side by a left-hand cylindrical section 1.1. As soon as the soft shear zone 9 had formed, the two spindles 6, 7 of the glass lathe were offset radially to each other by about 2 mm, so that the spindle's two axes of rotation 6.1 and 7.1 were parallel but not coaxial to each other. Because of this radial offset, a deformation of the shear zone 9 was obtained in the direction of a non-circular, non-rotationally-symmetrical shape and a smaller width. This increased the homogenizing efficiency of the zone melting method.

In this way a glass cylinder with a diameter of about 79 mm was obtained.

METHOD EXAMPLE (C)—COMPARATIVE EXAMPLE

To homogenize the OH distribution a blank 1 produced according to example 2 was likewise subjected to a zone melting method, but without establishing an offset between the spindle's two axes of rotation 6.1 and 7.1; the axes of rotation 6.1 and 7.1 thus coincided. In this technique without a radial offset, the shear zone 9 was deformed in a circular or rotationally symmetrical fashion.

Figure 8:
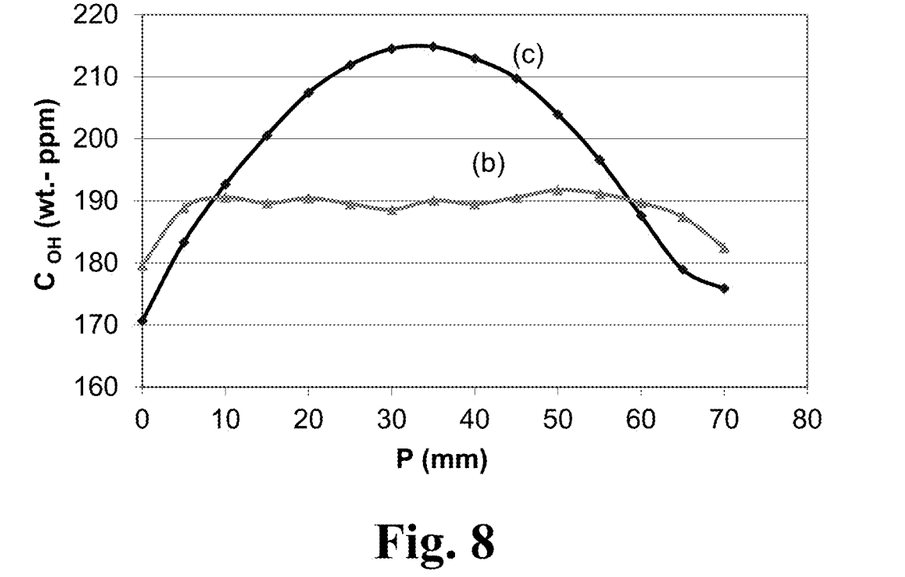
FIG. 8: a diagram to explain the action of an embodiment of the thermal-mechanical intermixing treatment on the radial OH-group concentration profile in the treated blank.

The diagram of FIG. 8 illustrates the difference in the radial hydroxyl group distributions of the samples of method example (b) and the comparative example (c). On the y-axis the hydroxyl group concentration Cox is plotted (in wt. ppm) against the radial position P (in mm), as measured in the homogenized glass rod. Curve (c) illustrates that without a lateral offset a parabolic OH-group distribution in the concentration range of 170 to 215 wt. ppm is maintained, as was also measured in the original twisted rod before the thermal-mechanical intermixing treatment. With the lateral offset of the axes of rotation according to method example (b), on the other hand, a distribution curve (b) is obtained which is flattened in the middle, having significantly lower OH variation in the concentration range between 180 and 190 wt. ppm.

Figure 3:
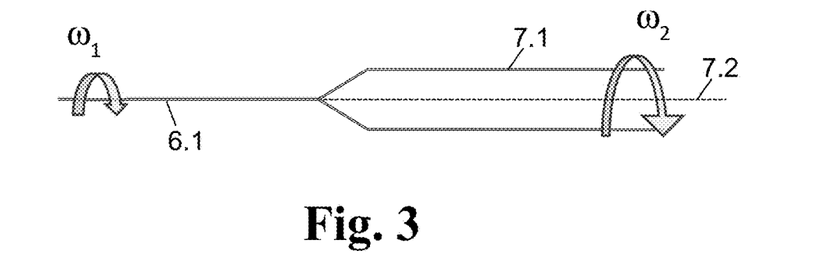
FIG. 3: a rotation figure for a blank which is obtained in a second procedure.

FIG. 3 illustrates a diagram of the rotation figure in another technique, which is produced by an off-centre arrangement of the support rod 3 for the right-hand cylindrical section 1.2 in the spindle 7. The central axis 7.1 of the cylindrical section 1.2 and/or its support rod 3 here is offset by 3 mm from the machine axis of rotation 7.2 of the spindle 7.

The first cylindrical section 1.1 thus rotates around the central axis 6.1 at the rotational speed $\omega_1$ and the second cylindrical section 1.2 is turned at the rotational speed $\omega_2$ around a circular path around the machine axis of rotation 7.2 of the spindle 7, which is coaxial to the central axis 6.1. The second cylindrical section 1.2 here does not rotate around its own central axis 7.1 but describes a circular path around the actual machine axis of rotation 7.2 and around the central axis 6.1 that is coaxial thereto.

In the shear zone 9 torsion is obtained not only due to different rotations ($\omega_1$: ($\omega_2=0$) of the cylindrical sections (1.1; 1.2) around their respective central axes (6.1, 7.1), but at the same time the cylindrical section 1.2 that is offset relative to the machine axis of rotation 7.2 of the spindle 7 describes a circular path around the common axis of rotation (central axis 6.1). This results in particularly intensive intermixing in the shear zone 9, not only in the tangential direction but also in the radial and partially also in the axial direction of the longitudinal axis of the blank.

Figure 4:
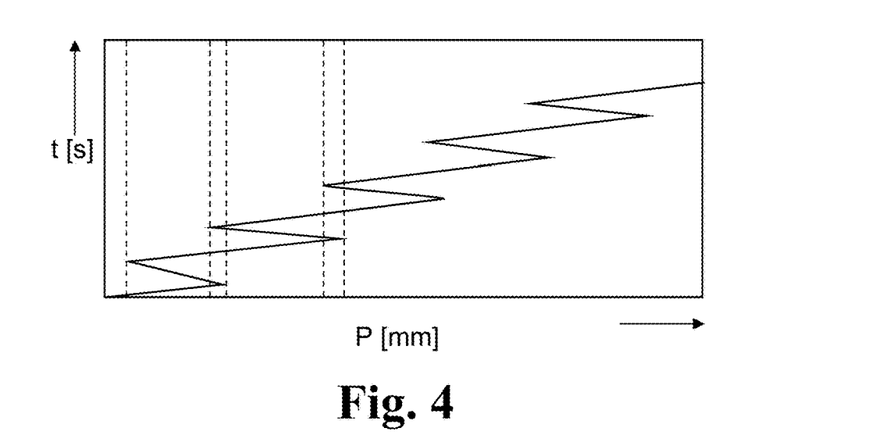
FIG. 4: a path-time diagram for the translational speed of a heat source along the longitudinal axis of the blank in a third procedure according to one embodiment.

In another technique for forming a non-rotationally-symmetrical, narrow shear zone with good intermixing even in the radial direction, the shear zone performs an alternating motion during transverse displacement along the longitudinal axis of the blank. FIG. 4 illustrates a diagram of a corresponding time-position diagram. On the y-axis the time t (in s) is plotted against the spatial position P of the heat source (in mm). The axial translational motion of a heat source along the longitudinal axis of the blank is superimposed with somewhat briefer reverse movements; some of the reversal points are marked by broken lines. During the forwards and backwards movement, the distances differ by a factor of about 2 and the rates of advance are equal.

METHOD EXAMPLE (D)

In another technique for homogenizing the OH distribution, a further blank, having a radial hydroxyl group profile with a step shape (see FIG. 9), was likewise subjected to a zone melting method using a thermal radiation dissipator 10 (as described with reference to FIG. 1). The oscillating motion of the shear zone here was generated by rotating the first cylindrical section at a first rotational speed $\omega_1$ and the second cylindrical section at a second rotational speed $\omega_2$, periodically varying the first and/or second rotational speed. Table 1 gives parameters of the preferred exemplary embodiment:

TABLE 1

| Rotation | Curve shape | Variation range [rpm] | Mean [rpm] | Amplitude [rpm] | Frequency [min$^{-1}$] |
|---|---|---|---|---|---|
| $\square_1$ | Sinusoidal | 40-160 | 100 | 60 | 1.2 |
| $\square_2$ | Sinusoidal | (−160)-(−40) | −100 | 60 | 1.2 |

The rotational speeds $\omega_1$ and $\omega_2$ changed periodically according to a sinusoidal oscillation, the oscillation frequencies being of equal size, so that a constant phase shift of 200 rpm was obtained. The mean values and amplitudes differed, however, so that a periodic change in the rotational speeds was obtained which led to an oscillating motion of the shear zone.

METHOD EXAMPLE (E)—COMPARATIVE EXAMPLE

To homogenize the OH distribution the quartz glass blank as mentioned in method example (d) with a step-shaped radial hydroxyl group distribution profile was likewise subjected to a zone melting method, but without an oscillating motion of the shear zone as in method example (d). The rotational speeds of the spindle's axes of rotation 6.1 and 7.1 here were adjusted to constant values of −20 rpm and +180 rpm respectively and the axes of rotation 6.1 and 7.1 thus coincided. In this technique the shear zone 9 was deformed in a circular or rotationally symmetrical fashion.

Figure 9:
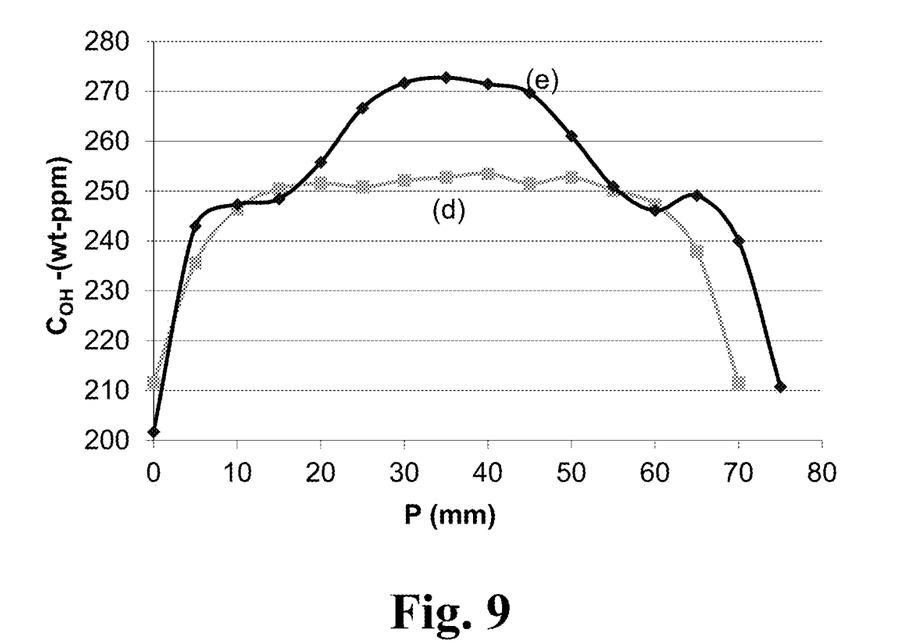
FIG. 9: a diagram to explain the action of a further embodiment of the thermal-mechanical intermixing treatment on the radial OH-group concentration profile in the treated blank.

The diagram of FIG. 9 illustrates the difference in the radial hydroxyl group distribution of the samples of method example (d) and comparative example (e). On the y-axis the hydroxyl group concentration $C_{OH}$ (in wt. ppm) is plotted against the radial position P (in mm), as measured in the homogenized glass rod. Curve (e) illustrates that, without an oscillating motion of the shear zone, an OH group distribution is obtained with a marked concentration maximum in the centre of the blank and in a concentration range of 200 to 270 wt. ppm. In contrast, curve (d) illustrates that with an oscillating motion of the shear zone according to method example (d) a hydroxyl group concentration profile is obtained which is flattened in the middle and has a significantly smaller OH variation in the concentration range of between 210 and 250 wt. ppm.

Figure 5:
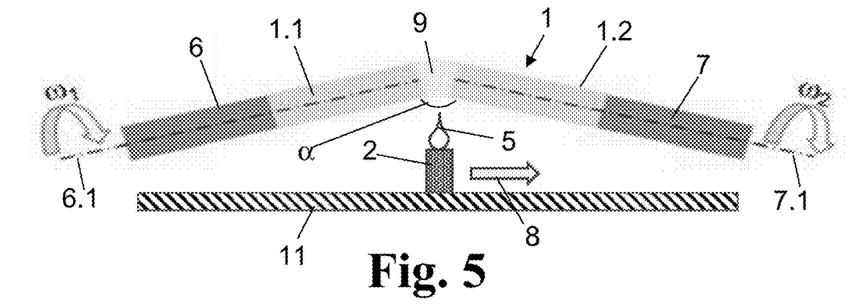
FIG. 5: a variant of the zone melting method with axes of rotation tilted relative to each other according to one embodiment.

FIG. 5 illustrates a diagram of a further technique for intensive intermixing in the shear zone. The same reference numbers as in FIG. 1 denote the same or equivalent components or parts as already explained with reference to FIG. 1. In this technique the two central axes 6.1 and 7.1 are arranged such that they are tilted relative to each other, so that they form a tilt angle α of about 165 degrees. The cylindrical sections 1.1 and 1.2 here are oriented such that the first central axis 6.1 and the second central axis 7.1 extend downwards starting from the shear zone 9. If the vertical positions of the two glass-lathe spindles 6, 7 remain constant during a twisting stroke (indicated by the directional arrow 8), the tilt angle varies continuously. In this method variant too, the thermal radiation dissipator 70 explained with reference to FIG. 1 can be used advantageously.

Figure 6:
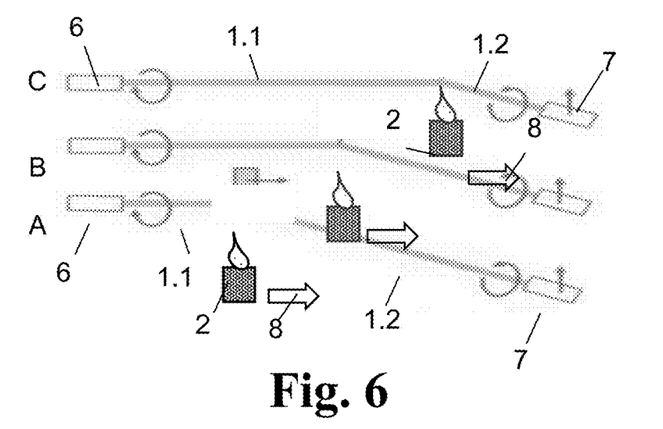
FIG. 6: measures for keeping the tilt angle constant throughout a twisting stroke in the procedure of FIG. 5, FIG. 7: an enlarged illustration of a tubular thermal radiation dissipator in a view of its end face.

In order to keep the tilt angle a constant in the course of the zone melting method, a vertical adjustment of the spindles 6, 7 (or of the respective chuck) is necessary, as indicated schematically in FIG. 6 with reference to three process phases A, B and C. Starting from the process phase A with a comparatively short left-hand cylindrical section 1.1 and a comparatively long right-hand cylindrical section 1.2, the continuous displacement of the heating burner 2 and the shear zone 9 towards the right-hand glass lathe spindle 7 requires a continuous raising of the right-hand glass lathe spindle 7 to keep the tilt angle a constant in the course of the zone melting method, as illustrated by the directional arrows 62. Instead of the continuous movement of one of the spindles (chucks), it is also possible to displace both (spindles) chucks in a vertical direction. To keep the length of the blank constant, the chucks can be moved towards each other.

Figure 7:
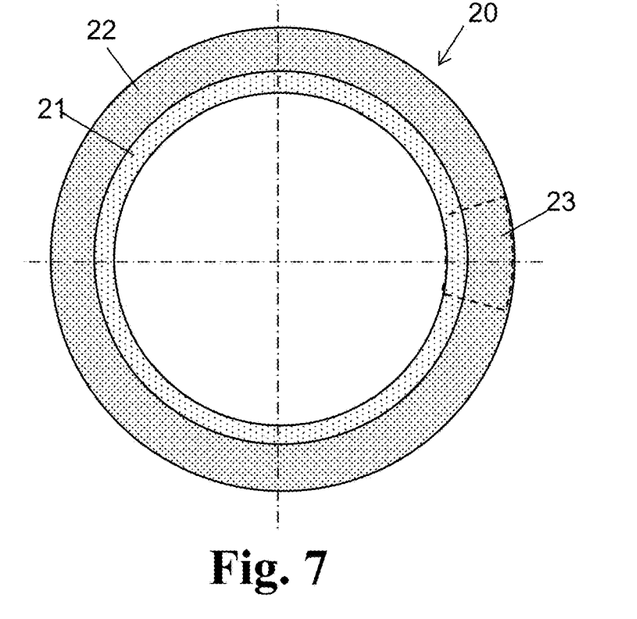

FIG. 7 illustrates a larger illustration of the thermal radiation dissipator 70 of FIG. 1 in a view of its end face. The wall consists of two coaxial and adjacent layers, specifically an inner layer 71 composed of synthetically produced quartz glass with a low bubble content and a layer thickness of 1.5 mm and an immediately adjacent outer layer 72 composed of synthetically produced, opaque quartz glass with a layer thickness of 15 mm. The glassy inner layer 71 contains no visually discernible pores. It reflects part of the impinging infrared radiation (about 4% of the total radiation intensity) and is otherwise transparent to infrared radiation over a broad wavelength range. The opacity of the adjacent outer layer 72 is produced by a porosity of about 5%. The infrared radiation impinging on the outer layer 72 is likewise partially reflected at the interface with the inner layer 71, but is predominantly scattered and absorbed in the outer layer 72. Apart from an access opening 73 for the heating burner 2, the wall is closed. The end faces are open.

In the zone melting method according to one embodiment, the thermal radiation dissipator 70 absorbs part of the heat energy from the shear zone 9 in particular by heat radiation and heat conduction, thus being heated itself, and emits this energy as longer-wave infrared radiation. The thermal radiation dissipator 70 is arranged centrally to the shear zone 9 and projects beyond it at both ends, so that the emitted heat energy is also transferred to the bulk of the glass adjacent to the shear zone 9. Compared to a zone melting method without the thermal radiation dissipator 70 the axial temperature gradient and the temperature difference between the middle of the blank and its periphery are reduced by the pre- and post-heating. A contribution to this is made by the fact that the burner gases introduced through the central access opening 23 into the gap 12 between thermal radiation dissipator 70 and blank 1 flow out at both ends of the shear zone 9 to the right and left along the longitudinal axis of the blank 10, thus heating the regions next to the shear zone 9.

As a result of this evening out of the temperature profile within the shear zone 9, the risk of cracking due to mechanical stresses is reduced.

The double reflection at the layer sequence of inner layer 71 and outer layer 72 means that the non-reflected radiation component is only absorbed in the infrared-radiation-absorbing outer layer 72 and generates heat there, whereas the hot gas atmosphere around the shear zone 9 only acts on the tubular inner wall of the thermal radiation dissipator 70 by heat conduction. The heat input into the thermal radiation dissipator 70 by radiation therefore takes place substantially in the outer layer 72 and thus at a different point to the heat input by heat conduction. As a result, on the one hand the inside remains hot enough to bind $SiO_2$ deposits on the inside and vitrify them so that they do not fall off, and on the other hand an overheating of the inside is avoided.

The following table illustrates test parameters and results of zone melting methods with a thermal radiation dissipator (Test 1) and without a thermal radiation dissipator (Test 2).

TABLE 2

| Test | $\square_1$ [rpm] | $\square_2$ [rpm] | $T_{max}$ [° C.] | v [mm/min] | B [mm] | Cracks |
|---|---|---|---|---|---|---|
| 1 | −60 | +140 | 2290 | 10 | 5 | No |
| 2 | −60 | +140 | 2140 | 8 | 9 | Yes |

The terms in the table have the following meanings:
$\omega_1$, $\omega_2$: rotational speeds on either side of the shear zone
$T_{max}$: maximum temperature in the region of the shear zone
v: translational speed of heating burner and thermal radiation dissipator
B: maximum width of the shear zone
Cracks: occurrence of a crack after completion of the zone melting method.

Although specific embodiments have been illustrated and described herein, it will be appreciated by those of ordinary skill in the art that a variety of alternate and/or equivalent implementations may be substituted for the specific embodiments illustrated and described without departing from the scope of the present embodiments. This application is intended to cover any adaptations or variations of the specific embodiments discussed herein. Therefore, it is intended that these embodiments be limited only by the claims and the equivalents thereof.

The invention claimed is:

1. A method for homogenizing glass, comprising:
   (a) providing a cylindrical blank composed of the glass having a cylindrical outer surface that extends along a longitudinal axis of the cylindrical blank over a length of the cylindrical blank between a first end face and a second end face;
   (b) forming a shear zone in the cylindrical blank by softening a longitudinal section of the cylindrical blank and subjecting it to a thermal-mechanical intermixing treatment; and
   (c) displacing the shear zone along the longitudinal axis of the blank,
   wherein cylindrical sections of the cylindrical blank are adjacent to the shear zone on both sides, a first cylindrical section having a first central axis and a second cylindrical section having a second central axis, the first central axis and the second central axis being at least temporarily non-coaxial with each other.

2. The method according to claim 1, wherein the first central axis and the second central axis are offset relative to each other at least at times.

3. The method according to claim 2, wherein the central axis offset is adjusted to a value in the range of between 0.5% and 15% of the diameter of the blank.

4. The method according to claim 3, wherein at least the first central axis additionally extends with an offset relative to a first axis of machine rotation around which it is rotated.

5. The method according to claim 4, wherein the first cylindrical section is rotated around the first axis of machine rotation and the second cylindrical section is rotated around a second axis of machine rotation, wherein the first and the second axis of machine rotation extend parallel to each other and are offset relative to each other.

6. The method according to claim 2, wherein at least the first central axis additionally extends with an offset relative to a first axis of machine rotation around which it is rotated.

7. The method according to claim 6, wherein the first cylindrical section is rotated around the first axis of machine rotation and the second cylindrical section is rotated around a second axis of machine rotation, wherein the first and the second axis of machine rotation extend parallel to each other and are offset relative to each other.

8. The method according to claim 1, wherein the first central axis and the second central axis are tilted relative to each other at least at times or run skew to each other at times, wherein the first cylindrical section is rotated around the first central axis and the second cylindrical section is rotated around the second central axis.

9. The method according to claim 8, wherein the cylindrical sections extend obliquely downwards, starting from the shear zone.

10. The method according to claim 8, wherein the cylindrical sections are oriented such that they extend obliquely upwards, starting from the shear zone.

11. The method according to claim 1, wherein the cylindrical blank has a diameter D and that the shear zone has a width that is less than 0.3×D.

12. The method according to claim 1, wherein the shear zone is at least partly surrounded by a thermal radiation dissipator, the lateral dimension of which, in the direction of the longitudinal axis of the blank, is greater than the shear zone and smaller than the length of the blank, wherein the thermal radiation dissipator is moved along the longitudinal axis of the cylindrical blank synchronously with the shear zone.

13. A method for homogenising glass, the method comprising:
   (a) providing a cylindrical blank composed of the glass having a cylindrical outer surface that extends along a longitudinal axis of the cylindrical blank over a length of the cylindrical blank between a first end face and a second end face;
   (b) forming a shear zone in the cylindrical blank by softening a longitudinal section of the cylindrical blank and subjecting it to a thermal-mechanical intermixing treatment; and
   (c) displacing the shear zone along the longitudinal axis of the blank,
   wherein the displacement of the shear zone along the longitudinal axis of the cylindrical blank is superimposed at least at times with an oscillating motion of the shear zone along the longitudinal axis of the blank,
   and wherein cylindrical sections of the cylindrical blank are adjacent to the shear zone on both sides, a first cylindrical section have a first central axis and the second cylindrical section having a second central axis, the first central axis and the second central axis being at least temporarily noncoaxial with each other.

* * * * *